United States Patent
Trost et al.

(10) Patent No.: US 11,131,778 B2
(45) Date of Patent: Sep. 28, 2021

(54) ELECTRONIC DOSIMETER FOR ALARM GENERATION IN PULSED RADIATION FIELDS

(71) Applicant: THERMO FISHER SCIENTIFIC MESSTECHNIK GMBH, Erlangen (DE)

(72) Inventors: Norbert Trost, Erlangen (DE); Michael Iwatschenko-Borho, Erlangen (DE)

(73) Assignee: Thermo Fisher Scientific Messtechnik Gmbh, Erlangen (DE)

( * ) Notice: Subject to any disclaimer, the term of this patent is extended or adjusted under 35 U.S.C. 154(b) by 106 days.

(21) Appl. No.: 16/545,217

(22) Filed: Aug. 20, 2019

(65) Prior Publication Data

US 2020/0064494 A1    Feb. 27, 2020

Related U.S. Application Data

(60) Provisional application No. 62/420,277, filed on Aug. 21, 2018.

(51) Int. Cl.
*G01T 1/15* (2006.01)
*G01T 7/12* (2006.01)
*G01T 3/08* (2006.01)

(52) U.S. Cl.
CPC ............. *G01T 1/15* (2013.01); *G01T 3/08* (2013.01); *G01T 7/125* (2013.01)

(58) Field of Classification Search
None
See application file for complete search history.

(56) References Cited

U.S. PATENT DOCUMENTS

| 2007/0045546 | A1* | 3/2007 | Hsi | G01T 1/02 250/361 R |
| 2014/0252238 | A1* | 9/2014 | Jung | G01T 1/023 250/362 |

(Continued)

FOREIGN PATENT DOCUMENTS

| EP | 0479334 A2 | 4/1992 |
| EP | 3220166 A2 | 9/2017 |

(Continued)

OTHER PUBLICATIONS

Mukhopadhyay, S. et al., "Neutron Energy Measurements in Emergency Response Applications", Proceedings of SPIE, vol. 7449, Aug. 20, 2009, pp. 744913, XP55392305, US, DOI: 10.1117/12.824624, ISBN: 978-1-5106-1533-5.

(Continued)

*Primary Examiner* — Yara B Green
(74) *Attorney, Agent, or Firm* — William R. McCarthy, III

(57) ABSTRACT

A portable electronic dosimeter is described that comprises a plurality of detectors each configured to detect a type of ionizing radiation, wherein each detector is associated with an amplifier configured to produce an output in response to a plurality of detected photons of the ionizing radiation and an event counter configured to produce one or more counts in response to the detected photons of the ionizing radiation over an integration time; and a processor configured to receive the one or more counts from each of the counters and determine if there is coincidence of the one or more counts of all the detectors, wherein if there is coincidence the processor is configured to provide an over range alarm signal.

22 Claims, 7 Drawing Sheets

(56) References Cited

U.S. PATENT DOCUMENTS

2014/0263989 A1 9/2014 Valentino et al.
2016/0163095 A1* 6/2016 Wollenweber ......... A61B 6/037
　　　　　　　　　　　　　　　　　　　　　382/131

FOREIGN PATENT DOCUMENTS

GB          2255177 A    10/1992
WO    WO-2005008286 A2   1/2005
WO    WO-2015024591 A1   2/2015

OTHER PUBLICATIONS

Ambrosi et al., "Considerations Concerning the Use of Counting Active Personal Dosemeters in Pulsed Fields of Ionising Radiation," Radiation Protection Dosimetry, Jan. 18, 2010, vol. 139, No. 4, pp. 483-493.
Owen et al., "Determination of X-ray Flux Using Silicon Pin Diodes," Journal of Synchrotron Radiation, Sep. 2, 2008, vol. 16, pp. 143-151.
PCT/EP2019/072292, Search Report and Written Opinion, dated Nov. 12, 2019.

* cited by examiner

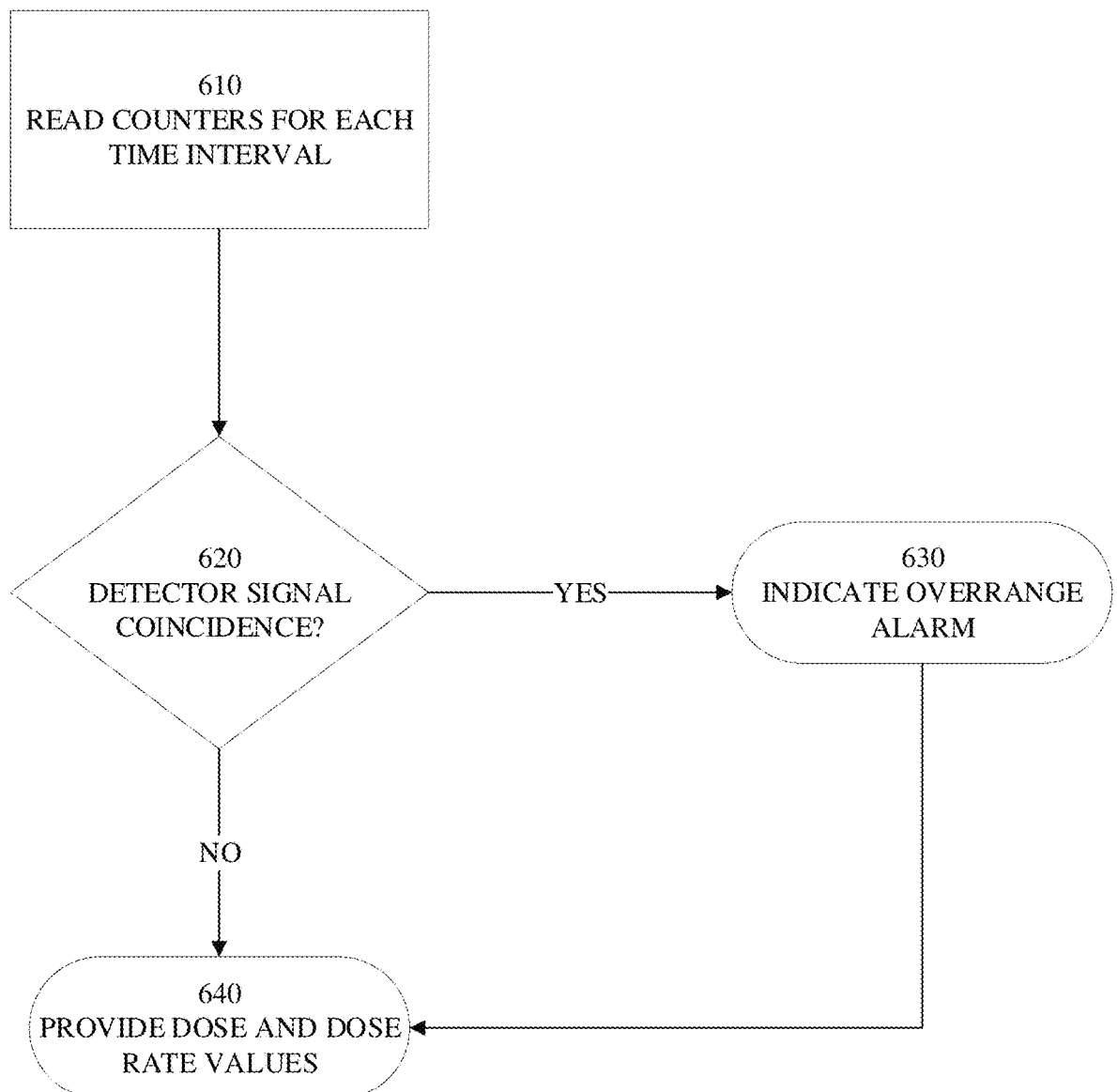

ELECTRONIC DOSIMETER FOR ALARM GENERATION IN PULSED RADIATION FIELDS

CROSS-REFERENCE TO RELATED APPLICATIONS

The present application claims the priority benefit from U.S. Patent Application Ser. No. 62/720,277, filed Aug. 21, 2018. The disclosure of the foregoing application is incorporated herein by reference.

FIELD OF THE INVENTION

The presently described invention is generally directed to electronic personal radiation dosimeter devices and methods for use in pulsed radiation fields.

BACKGROUND OF THE INVENTION

The safety of personnel in the presence of pulsed ionizing radiation sources has become more important with the increase in usage of these sources. The term "radiation dosimeter" as used herein generally refers to a device that measures exposure to ionizing radiation. Such devices play a vital role for workers in certain industries where there is routine radiation exposure. It is important for these workers to monitor the cumulative dose over time to ensure that their exposure does not exceed safe levels. There are a number of types of radiation dosimeters available that fall into two general classes.

The first class is referred to as a "passive" dosimeter that is sensitive to ionizing radiation and records a value of cumulative radiation dose (also sometimes referred to in a biological context as an "effective dose" or "equivalent dose" value that may be measured in units including "Sievert" (Sv) or in a physical context that may be measured in units including "Gray" (Gy)). Typical embodiments of passive dosimeter do not have the capability to directly communicate the dose value to the user nor do they have the ability to alert the user of immediate radiation hazard. Passive dosimetry devices, such as for example thermoluminescent dosimeters (TLD) are widely used to monitor exposure to radiation. Typical embodiments of passive dosimeter devices provide a cumulated reading of exposure that represents the dose received over an extended period of time. In some cases the exposure reading is provided weeks or months after the actual exposure to the ionizing radiation.

The second class of dosimeter is referred to as an "active" dosimeter, which may include an "electronic personal radiation dosimeter" that continuously measures and provides a communication reporting the dose value to the user. Because it is monitoring the dose value in real-time, it can also provide a dose rate (e.g. Sv/h) that cannot be provided by a passive dosimeter. Also, many embodiments of electronic personal radiation dosimeter typically include an alarm function that provides the user with an audible and/or visual and/or tactile (e.g. vibrating) indication that a threshold dose or dose rate value has been reached. Similarly, many embodiments of electronic personal radiation dosimeter typically include a record of dose history that provides the user with an indication of the dose received as a function of time. True active dosimetry provides a significant benefit over passive dosimetry because users can be informed in "real-time" when they have entered a radiation field that may pose a danger to the user, thus providing the user with the opportunity to remove themselves from harm's way. The term "real-time" as used herein typically refers to reporting, depicting, or reacting to events at the same rate and sometimes at the same time as they unfold (e.g. within a few seconds or fractions of a second) rather than taking notice of a much later report.

In the following description, "counting mode" is used to mean "pulse counting mode" as described in Glenn/Knoll, Radiation Detection and Measurement, fourth edition chapter 17-II, which is hereby incorporated by reference herein in its entirety for all purposes. Currently available electronic personal radiation dosimeters typically operate in counting mode. For example, in a typical embodiment of a counting device, photons of radiation are detected and processed into a signal. If that signal matches appropriate parameters (e.g. amplitude, shape, etc.) it is counted as an event (also referred to as a "count") that corresponds to an increment of dose. Typical embodiments also use dead time correction (As described in Glenn/Knoll, chapter 4-VII, incorporated by reference above). Thus, event counting devices are able to provide real-time alerts (e.g. audible alarms, visual alarms, or tactile vibration alarms) when the count rate is high, or when the accumulated counts reach some preset level. In the present example, the counts are collected and one or more dose equivalents are computed and displayed from these counts.

Active dosimetry for ionizing radiation has traditionally focused on measurements of what is referred to as a "personal dose equivalent". The term "personal dose equivalent" as used herein generally refers to a quantity of ionizing radiation representing a safety threshold for exposure recommended by the International Commission on Radiation Units and Measurements (ICRU) for the dose equivalent in tissue at depth (d) below a specified point on the body. Examples of personal dose equivalents include a deep dose (e.g. for thoracic exposure) equivalent safety threshold value referred to as $H_p(10)$, an eye dose equivalent safety threshold value referred to as $H_p(3)$, and a surface dose (e.g. for skin exposure) equivalent safety threshold value of about $H_p(0.07)$. Those of ordinary skill in the related art appreciate that it is advantageous to monitor dose equivalent values for personnel who may be routinely exposed as part of their profession, such as for example personnel who work in the fields of interventional radiology and cardiology as well as the nuclear power and aviation industries.

Unlike passive dosimeters, active dosimeters always have an upper limitation with respect to the dose rate. For example, some radiation fields are very strong (sometimes referred to as "high fields" or "high intensity fields") and may exceed the range of detection elements employed with counting active dosimeters and need to be detected by the instrument in order to alert the user instantaneously ("over-range-detection") of a potentially hazardous condition. For example, event counting electronic personal radiation dosimeters may include detection elements such as one or more sensors, signal processors, and/or counting electronics that generally operate linearly. This can lead to missed event counts (sometimes referred to as "dead time"), and in some situations high fields can lead to saturation of one or more detection elements where the count rate saturates or even drops while the field strength increases (sometimes referred to as "fold over"). Conventionally the deviation of the measured count rate from a linear dependency in respect to the radiation field strength can be corrected by applying a dead time correction formula. In the present example, a limit of the detection range of current event counting active dosimeters may be evidenced by saturation in the count rate at a dose rate level above about typically 1 to 10 Sv/h.

However, such dead-time correction can only work correctly, if the radiation field is of continuous nature during the time interval of the analysis.

Currently available counting electronic personal radiation dosimeters, however, are known to have limited performance with respect to so-called pulsed radiation fields where the dose rate in the radiation pulse may be very high (e.g. too high for the correct registration in the instrument) while the dose rate averaged over a macroscopic time (e.g. a second or minute) is well within the specified dose rate measuring range. Typical examples for such pulsed radiation fields are medical X-ray devices with a radiation pulse width of several milliseconds or pulsed linear accelerators (LINACs) with a pulse width of typical several microseconds or X-ray flash instruments with a typical pulse width of 10 to 50 nanoseconds. A detailed discussion of the influence of pulse width and repetition frequency on active electronic dosimeters can be found in "CONSIDERATIONS CONCERNING THE USE OF COUNTING ACTIVE PERSONAL DOSEMETERS IN PULSED FIELDS OF IONISING RADIATION, Radiation Protection Dosimetry (2010) pp. 1-11, published Jan. 18, 2010, which is hereby incorporated by reference herein in its entirety for all purposes).

For pulsed radiation scenarios with a pulse length significantly exceeding the electronic signal pulse length of the active dosimeter, shortening the time interval (time resolution) can solve the problem of insufficient dead time correction or non-detection of an over-range condition. For example, the Thermo Fisher Scientific™ FH 40 GL-10 instrument allows setting of the count interval to 1 millisecond. In other words, for pulsed fields in the millisecond range, the pulsed radiation can be handled as continuous radiation and correctly be determined as long as the specified maximum dose rate in the pulse is not exceeded.

It is appreciated that high intensity fields can exhibit significantly shorter durations of time than the specified interval that an event counting device is capable of measuring. These ultra-short duration events where the radiation pulse duration is in the order or even much less than the signal resolution time (or dead time) of the counting device are often referred to as "radiation flashes". These radiation flashes are not accurately measureable by currently available active dosimeters and present a significant problem for users exposed to them. For example, this is increasingly important due to the growing use of pulsed fields in linear accelerators (LINACs), and non-destructive test (NDT) applications. It is generally appreciated that exposure to this kind of pulsed field needs to be accurately measured for the safety of personnel who are at risk of exposure.

Some embodiments of radiation dosimeter utilize what are referred to as "ionization chambers" that are well suited for detecting pulsed radiation. However in order to integrate the dose correctly, even at a low dose rate, voluminous ionization chambers are necessary. The use of ionization chambers is therefore reserved for larger devices that are not easily carried or worn by a user.

Compared to ionization chamber radiation dosimeter devices, electronic personal radiation dosimeters have the advantage of achieving comparable sensitivity with much smaller detectors and thus allow the overall device to be significantly smaller. The international standard for active dosimeters IEC 61526 specifies maximum dimensions of 15 cm×3 cm×8 cm and a maximum weight of 300 g. Actual electronic dosimeters on the market are typically significantly smaller and lighter for the convenience of the wearer.

Some embodiments of electronic personal radiation dosimeters may include what are referred to as "PIN diode" type detectors such as, for example, embodiments of electronic personal dosimeter described in Great Britain Patent No. 2 255 177 B, titled "Improvements in or relating to personal radiation dose in indicators", filed 7 May 1991, which is hereby incorporated by reference herein in its entirety for all purposes. The term "PIN diode", also sometimes referred to as a "p-type, intrinsic, n-type diode", is generally understood by those of ordinary skill in the related art to include a diode with a wide region of undoped intrinsic semiconductor material contained between a p-type semiconductor and an n-type semiconductor. Advantageously, PIN diodes can be operated either in counting mode or as ionization chambers as described in "Determination of X-Ray Flux Using Silicon PIN Diodes" which is hereby incorporated by reference herein in its entirety for all purposes. For example, while a typical PIN diode detector operated in counting mode will still integrate the dose correctly even at dose levels near background (e.g.—below 0.1 µSv/h), a corresponding PIN diode operated in ion-chamber mode provides only currents in the order of 1 pA at dose rates of mSv/h. Due to the need for correct operation of the electronic personal radiation dosimeter at low dose levels, it is advantageous to operate the PIN diode detectors in counting mode.

Compared to passive type dosimeters and ionization chambers, current electronic personal radiation dosimeters have the disadvantage of being unable to capture the dose of a pulse correctly once the maximum dose rate for continuous radiation is exceeded. Electronic personal radiation dosimeters can correctly measure the dose of short duration (typically <a few µs) pulsed X-rays, as long as the dose per X-ray pulse is smaller than the dose per count in continuous radiation. However, there are situations where a user is exposed to a dose rate that is too large for a correct dose indication in an electronic personal radiation dosimeter. In such cases the electronic personal radiation dosimeter typically fails to alert the user to the danger due to the fact that the electronic personal radiation dosimeter cannot accurately compute a measurement of the dose from the exposure. For example a user may be exposed to the direct beam of an industrial X-ray flash generator that produces a field of pulsed radiation that exceeds the measurement capability of the electronic personal radiation dosimeter worn by the user.

Therefore, there is a need for an electronic personal radiation dosimeter system and method that achieves real-time responsiveness to pulsed radiation fields and even for a single x-ray flash. Furthermore, it is advantageous and important that the device is able to warn the operator immediately once the dose rate is too large for correct dose indication in the device. Systems, methods, and products to address these and other needs are described herein with respect to illustrative, non-limiting, implementations. Various alternatives, modifications and equivalents are possible.

SUMMARY

An embodiment of a portable electronic dosimeter is described that comprises a plurality of detectors each configured to detect a type of ionizing radiation, wherein each detector is associated with an amplifier configured to produce an output in response to a plurality of detected photons of the ionizing radiation and an event counter configured to produce one or more counts in response to the detected photons of the ionizing radiation over an integration time; and a processor configured to receive the one or more counts from each of the counters and determine if there is coincidence of the one or more counts of all the detectors, wherein if there is coincidence the processor is configured to provide an over range alarm signal.

In some embodiments, the type of ionizing radiation includes gamma radiation, beta radiation, neutron radiation, and x-ray-radiation. Additionally, in some implementations, each detector is operated in a counting mode. Some implementations may include 2 or 3 detectors, and the over range alarm signal may indicate detection of a high intensity pulsed radiation field in some embodiments. In some cases, at least 1 detector comprises more than 1 threshold value with at least one of the threshold values being greater than a normal signal level from X-Rays.

Also in some implementations, the coincidence is determined by equality of at least 2 counter values. In the same or alternative implementations, the coincidence of detector signals is detected by analogue coincidence circuitry in the time range 0.1 to 10 μs. the integration time is in the range 0.1 ms to 1 s.

An embodiment of a method is also described that comprises detecting a plurality of photons of ionizing radiation using a plurality of detectors each enabled for a type of ionizing radiation, producing an output from each of the detectors in response to the plurality of detected photons, producing one or more counts in response to the detected photons of the ionizing radiation over an integration time; and determining if there is coincidence of the one or more counts of all the detectors.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 100 appears first in FIG. 1). All of these conventions, however, are intended to be typical or illustrative, rather than limiting.

FIG. 6 is a functional block diagram of one embodiment of a method for providing an over-range alarm.

Like reference numerals refer to corresponding parts throughout the several views of the drawings.

DETAILED DESCRIPTION OF EMBODIMENTS

As will be described in greater detail below, embodiments of the described invention include an active electronic personal radiation dosimeter that comprises a plurality of detectors and an alarm configured to give an over-radiation warning if the dose in the short duration radiation pulse is greater than the amount of dose that the instrument can process with sufficient accuracy.

Figure 1:
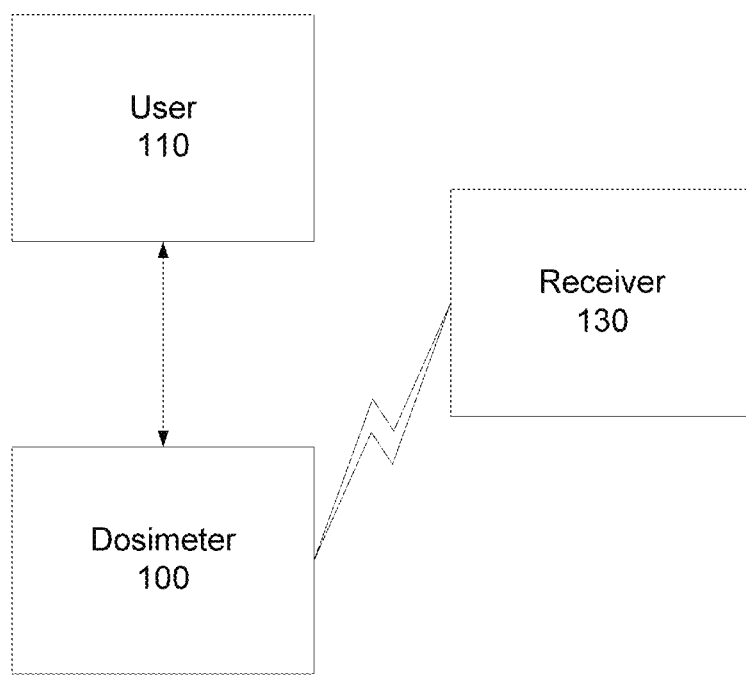
FIG. 1 is a functional block diagram of one embodiment of an electronic personal radiation dosimeter and a user including an optional wireless receiver.

FIG. 1 provides a simplified illustrative example of dosimeter 100 that is typically worn on the body of the user 110. FIG. 1 also illustrates receiver 130 that receives one or more wireless communications from dosimeter 100 and in some embodiments may provide user 110 with real-time information on radiation dose detected by dosimeter 100 based on the communications received. In some embodiments, receiver 130 may include a smart phone, tablet, other general-purpose wireless-capable device, or any receiver type device known in the field of active dosimetry. The term "close proximity" as used herein in reference to the spatial relationship between dosimeter 100 and user 110 generally refers to a location within a range where user 110 can unambiguously identify a signal from dosimeter 100 and respond accordingly. For example, an acceptable range may depend on the type and/or intensity of signal or combination of signals provided by dosimeter 100 such as audible, visual, or mechanical (e.g. vibration) signals. The arrow pointing from dosimeter 100 to user 110 indicates the direction of information flow, which includes numerical information regarding accumulated dose, current dose rate and various means of instantaneous alarm notification, which may include optical signalization audible sounder and tactile vibration alarm. Measured data and alarm status may be transmitted to an optional wireless receiver.

Also in some embodiments, dosimeter 100 may be configured to engage with a central base station when not in use by user 110. Embodiments of the central base station may provide charging capability for dosimeter 100 as well as a network connection that provides the capability for dosimeter 100 to transmit data to other computing devices via the network and/or receive information such as software updates, detection parameters, security identifiers, etc. Further, some or all embodiments of a central base station may include a processor or microprocessor as well as data storage elements that may be particularly useful if a consistent network connection is not available.

As described above, with short duration pulses at high intensities, such as those that occur in the direct beam of certain X-ray sources, the amplifiers of the detectors of an electronic dosimeter may be driven into saturation. This is because, within the amplifier integration time of typically a few μs, several photons ionize the sensitive volume of the detector. The resulting amplifier output signal can have much higher amplitudes than produced by a single ionization event for a given photon energy up to saturation of the amplifier. Such high dose rate short pulses can produce a synchronous signal in all detector channels (also sometime referred to as coincidence), such as for example a signal of one count per X-ray flash in each detector channel.

Figure 2:
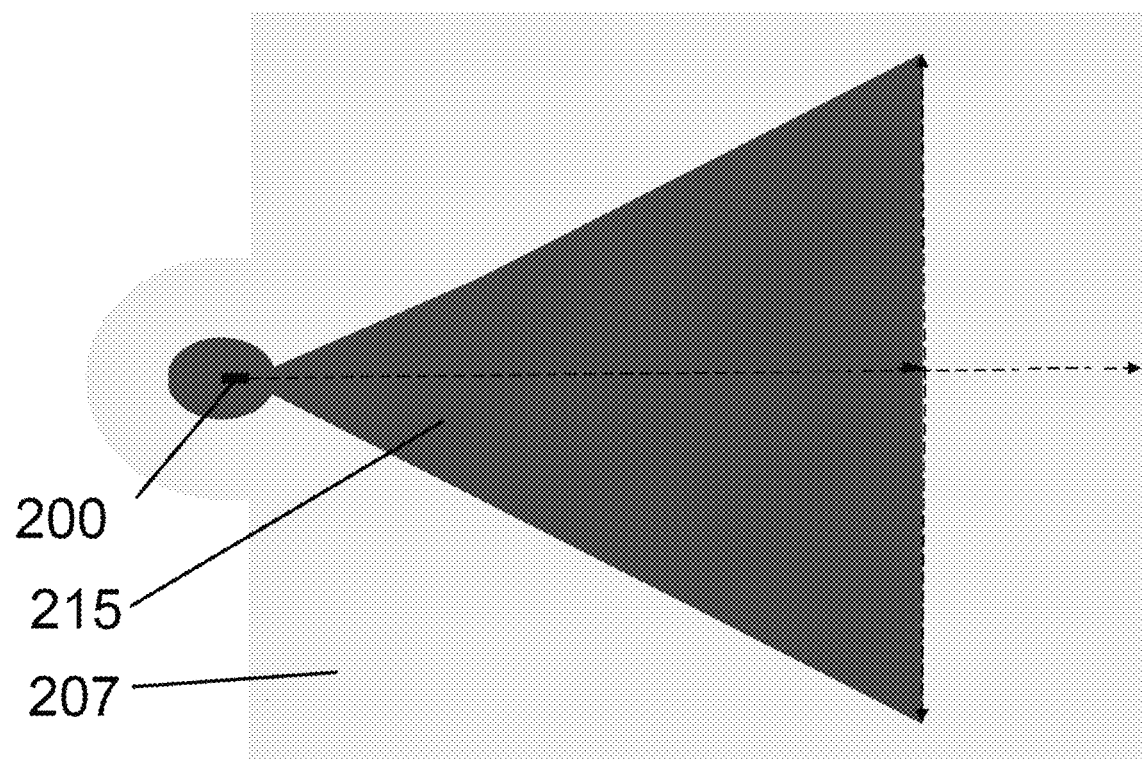
FIG. 2 is a simplified graphical representation of one embodiment of an x ray device having zones of danger or exclusion zones where short duration high dose rate pulses are present.

FIG. 2 provides an illustrative example of X-ray source 200 (e.g. may include an X-ray flash generator) that has exclusion zone 207 which is typically defined by the manufacturer of X-ray source 200 as a region where no person must be present during execution of an exposure. It is the purpose of the active dosimeter according to the present disclosure, to:

a) Correctly accumulate the received dose from the X-ray source 200 outside of zone 207 and 215 b) Correctly accumulate the received dose from the X-ray source 200 in zone 207, and provide a warning during an extended stay in this zone c) Provide instantaneous warning to the user in zone 215. The dose may eventually not be fully registered during the related short-term exposure (typically seconds) until the person is able to respond and leave the danger zone 215.

Also, as described above, electronic personal radiation dosimeters often use PIN diodes as detectors operated in counting mode. For example, an embodiment of dosimeter 100 may include at least two detectors, where each detector may have one or more signal processing elements that in some embodiments may comprise one or more amplitude discriminators configured to detect a different type of radiation. However, it will also be appreciated that dosimeter 100 may include three or more detectors as will be described in greater detail below. Therefore this example should not be considered as limiting.

Figure 3:
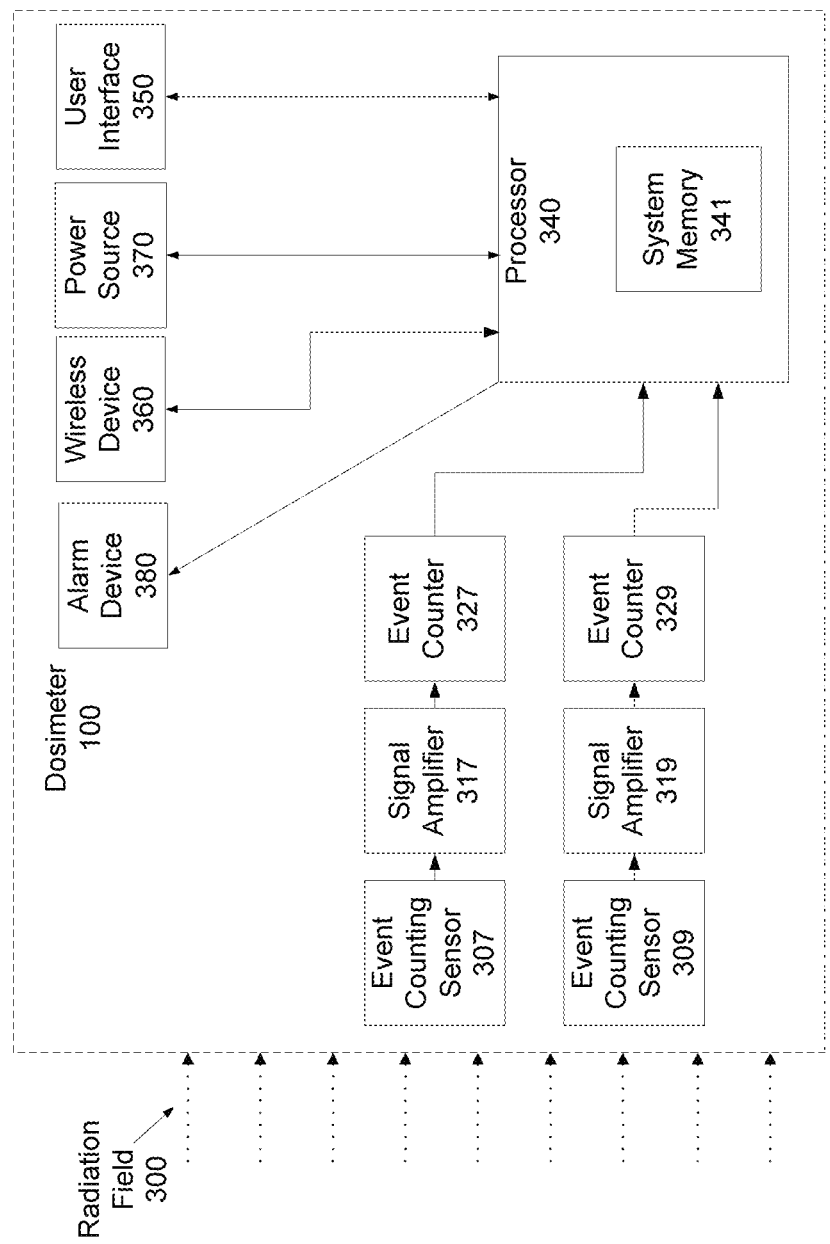
FIG. 3 is a functional block diagram of one embodiment of the electronic personal radiation dosimeter of FIG. 1.

FIG. 3 provides an illustrative example of an embodiment of dosimeter 100 capable of providing an over-radiation warning using at least two sensors each configured to detect a different type of ionizing radiation. For instance, FIG. 3 illustrates event counting sensors 307, and 309 each of which are enabled to measure particular aspects of radiation field 300 in a complementary fashion. FIG. 3 also illustrates additional components of dosimeter 100 configured to operate with event counting sensors 307, and 309 such as amplifiers 317 and 319. It will, however, be appreciated that additional signal processing components known to those of ordinary skill in the art could also be included (e.g. comparators, etc.). In the example of FIG. 3, amplifier 317, and 319 each receives the output from its corresponding event counting sensor 307, or 309 and provides a measure of dose of an event detected from the radiation which is then provided to a corresponding embodiment of counter 327, or 329. Embodiments of counter 327, or 329 integrate the number of events detected over a period of integration time (e.g. may include a range between 1 ms-1 second) and communicates a measure such as count rate to processor 340 (e.g. an average of detection events over a unit of time such as counts per second "cps").

Also in the example of FIG. 3, processor 340 may comprise one or more processors and/or microprocessors coupled with system memory 341 that comprises one or more data storage elements that may include solid state storage technologies known in the related art. In the described embodiments, processor 340 employs control logic (e.g. software program, including program code) stored in system memory 341. The control logic, when executed by processor 340, causes the processor to perform functions described herein. For example, processor 340 implements software that executes a processing algorithm that receives inputs from event counters 327 and 329, and sends and receives information to/from user interface 350. Further, alarm device 380 may comprise one or more elements configured to signal user 110 of an event or condition that may include, but is not limited to, a sounder, a vibration element, and/or an optical alarm indicator.

FIG. 3 further illustrates an embodiment of wireless device 360 that may include a radio element and wireless antenna. Wireless device 360 may communicate with receiver 130 via any wireless technology known to those of ordinary skill in the related art and may depend, at least in part, on various criteria. The criteria may include, but is not limited to, range of transmission, data security, power requirements, physical dimension of radio and/or antenna, 1-way or 2-way communication, or other criteria. For example, direct device to device communication can be achieved using what is generally referred to as "Bluetooth" technology that has become a standard for exchanging data over short distances using short-wavelength UHF radio waves. Alternatively, wireless device 360 may communicate with receiver 130 via an intermediate. Some examples of communication intermediate using intermediate devices include what is referred to as Wi-Fi that communicates via wireless router devices and cellular based communications that utilize cellular communication points supported by a telecommunications provider (e.g. a text-based standard for communication (also referred to as "short message service" (SMS)).

In the described embodiments, counting sensors 307, and 309 may include any type of event counting sensor known in the art of active dosimetry. For example, each of event counting sensors 307, and 309 may be enabled to detect one or more of gamma radiation, beta radiation, neutron radiation, and X-ray-radiation. The specific sensor technology may depend, at least in part, on the type(s) of radiation that the embodiment of dosimeter 100 is designed to measure. In the present example, some embodiments may include what is referred to as a photodiode which may include a "PIN diode detector" capable of measuring at least gamma radiation and X-ray radiation. Also, various components of dosimeter 100 receive power from power source 370 which may include one or more batteries that in some embodiments may be rechargeable. Likewise, user interface 350 may include a display (e.g. liquid crystal display, touch screen comprising a graphical user interface (GUI), or other type of display interface known in the related art), and/or one or more buttons. In some embodiments, alarm device 380 may include a speaker interface for audible communication (e.g. an alert message or alarm), one or more visual alarm indicators, and/or tactile alarm indicators.

Figure 4:
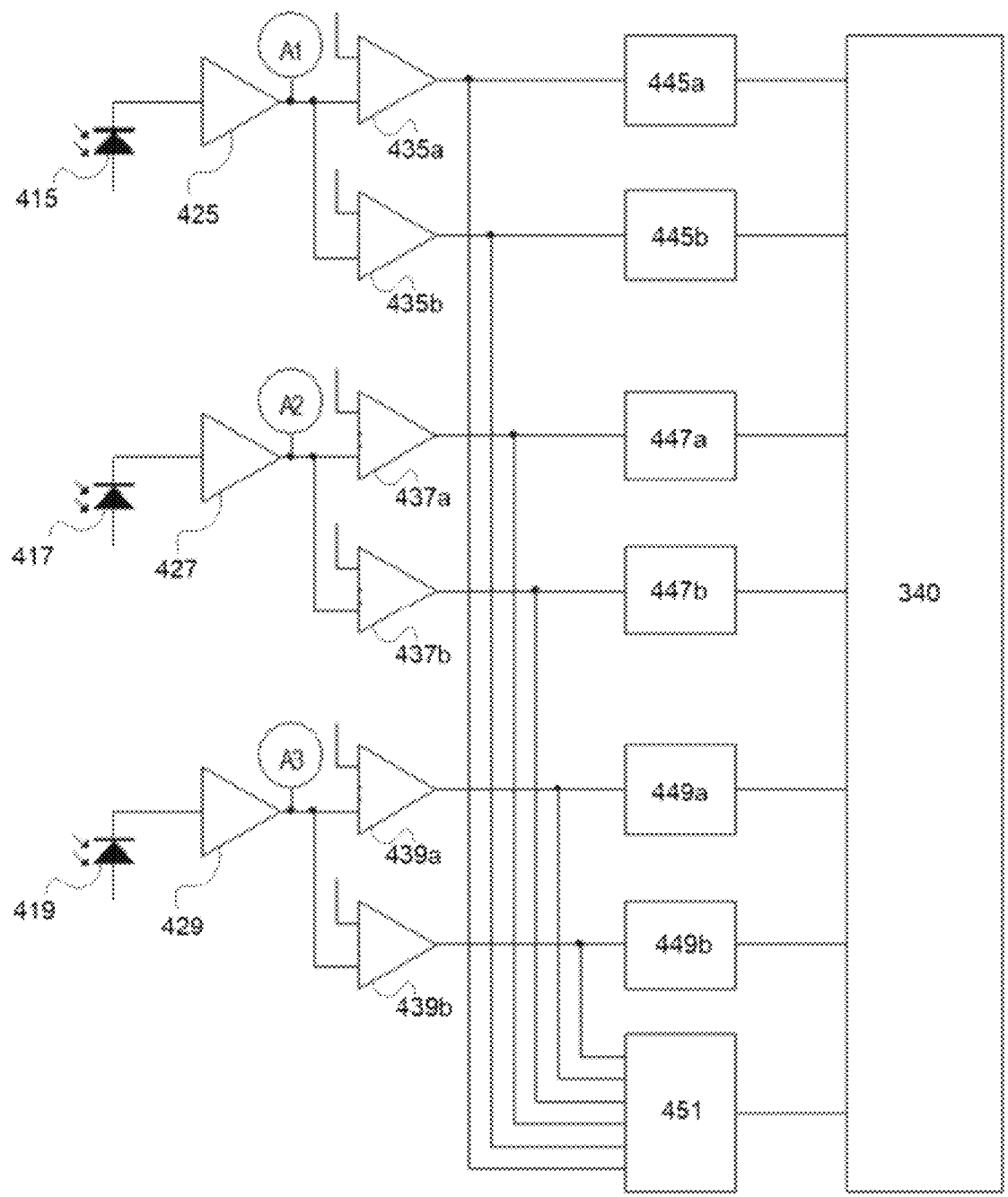
FIG. 4 is a simplified graphical representation of one embodiment of a circuit of the electronic personal radiation dosimeter of FIG. 1.

FIG. 4 provides a schematic illustration of an exemplary embodiment of a circuit design implemented by dosimeter 100 which uses three PIN diode detectors (415, 417, 419). Ionizing radiation that comprises photons or Beta particles deposit charge in the intrinsic zone of the diodes of detectors 415, 417, 419, which results in a charge pulse that is amplified with amplifiers 425, 427, 429 and provide "detector amplifier outputs" represented by A1, A2, and A3. The signals are then amplitude discriminated with one or more threshold comparators (435a, 435b); (437a, 437b); (439a, and 439b) (also sometimes referred to as "amplitude discriminators"). Signals from each threshold comparators are counted by an individual counter (445a, 445b); (447a, 447b); (449a, and 449b) and transmitted to processor 340. In the presently described example, each photon that interacted in the sensitive volume of a detector is counted and subsequently corrected for dead time losses. The number of dead time corrected counts from each detector multiplied by a dose per count factor for each counting channel and summed up to form the detected dose value.

Continuing the example of FIG. 4, each embodiment of PIN diode detector 415, 417, or 419 is configured to detect a particular type of radiation. For instance, PIN diode detector 415 may be configured to detect what is referred to as "hard Gamma" radiation, PIN diode detector 417 may be configured to detect what is referred to as "soft Gamma" radiation, and PIN diode detector 419 may be configured to detect what is referred to as "Beta" radiation. Each PIN diode detector can incorporate the appropriate filters to allow the detection of specific radiation energies. Processor 340 performs a counter readout at regular intervals that may include a 1 ms interval, or other interval period that may be useful for the particular application.

In typical operation of dosimeter 100, two or more counter embodiments may output a value equal to one count, which indicates that the detected radiation rate of the associated embodiment of PIN diode detectors has exceeded the range of the detector (e.g. detector saturation). However, the random occurrence of all embodiments of counters 445, 447, or 449 outputting a value equal to one count is extremely unlikely as the threshold value of at least one counter embodiment is set high enough so that range of the channel is not exceeded by normal levels of radiation, even at relatively high dose rates. The term channel, as used herein, generally refers to a pathway from one of the PIN diode detectors to processor 340 (e.g. PIN diode detector 415, amplifier 425, comparator 435, counter 445). For example, it is highly desirable that the channel with the highest threshold value may only be exceeded by high energy photons (e.g. from Cs-137 or by a pile up of several lower energy X-ray photons within the amplifier integration time at very high dose rates as they occur during an X-ray flash pulse). Thus, a random occurrence where all counters (e.g. 2 counters, 3 counters, 6 counters, etc., depending on the embodiment) transmit a value equal to one count is considered to be the result of a pulsed field event with high intensity such as that from an X-Ray flash pulse which presents potential danger to user 110. In the embodiments described herein, in such a situation dosimeter 100 may not be capable of providing an accurate accumulation of dose, however it is clearly associated with potentially harmful levels of radiation and thus is used to trigger the alarm function of the dosimeter 100.

In some embodiments, the likelihood of a random alarm could be decreased further by providing what is referred to as a coincidence circuit that may be implemented in hardware, firmware, or some combination thereof. For example, the circuit of FIG. 4 includes AND gate 451 that is a basic digital logic gate that behaves according to a set of rules.

As described herein, AND gate 451 may provide what is referred to as "coincidence" (see Glenn/Knoll, fourth edition, chapter 17-B2, incorporated by reference above) that can be used by processor 340. In a typical embodiment the output of the AND gate 451 provides a signal to processor 340 if a synchronous event is detected in all detector channels. In other words, processor 340 determines that a coincidence exists when all counters (e.g. counters 415, 417, and 419) provide an equal value (e.g. one count) for an event comprising multiple pulses within an integration period (e.g. one second). For example, AND gate 451 receives the detector amplifier outputs A1, A2, and A3 from each of the threshold comparators 435, 437, and 439 and produces coincidence times of about the width of the analog pulses which may be about 5 μs.

Other methods to determine a coincidence event could also be employed, including, for example, a method that reads out the counters in relatively large intervals, up to an interval of one second, and determine that all counters have an equal condition as the criterion for a pulsed radiation event. The advantage of this method is that processor 340 can be kept sleeping most of the time reducing energy consumption and increasing battery life time, and it can be implemented on instruments by a change of firmware without a change of hardware components. This method however is limited to applications with continuous radiation levels near background because at typical sensitivity of PIN diode detectors used in electronic personal dosimeters (approximately 5 nSv per detected pulse) an occasional random coincidence could occur at dose rates of count rates approaching 1 count per readout interval. Another method may include speeding up the readout to smaller time intervals, such as for example a readout interval of about 1 ms. This will increase the useful operation range for continuous radiation dose rate by a factor of about 1000 compared to reading in relatively large intervals. Further, AND gate 451 could include a more sophisticated circuit that looks only at the leading edge of the pulse and could provide coincidence times in the order of magnitude of the X-ray pulse flash (e.g. <500 ns; see leading edge of signal in FIG. 5D described below).

Yet another method includes use of at least one of the detector thresholds with a high threshold level. For example, the high threshold channel is only triggered by high energy photons e.g. from Cs-137 or by a pile up of charges from several lower energy X-ray photons within the amplifier integration time at very high dose rates as they occur during an X-ray flash pulse. This method can advantageously be combined with the first three methods and avoids random coincidences for all continuous radiation X-Ray levels.

Figure 5A:
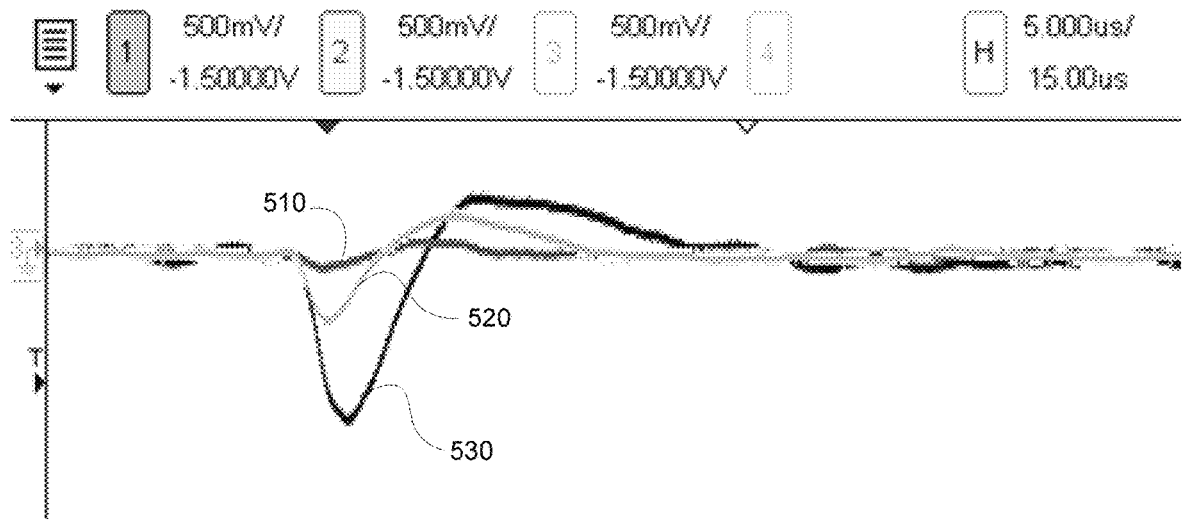
FIGS. 5A-5D are simplified graphical representations of one embodiment of detected signals measured by the detectors of the dosimeter of FIG. 1 positioned in the direct beam of an X-Ray Flash Generator.

FIGS. 5A, 5B, 5C, and 5D each provide an illustrative example of amplifier output pulses (e.g. A1, A2, and A3) from three detectors (e.g. PIN diodes 415, 417, and 419) with increasing dose per X-ray pulse. In particular, the example of FIG. 5A shows detected signals 510, 520, and 530 measured by the detectors of a dosimeter positioned in the direct beam of a Golden Industries model XR200 X-Ray Flash Generator at 10 m distance resulting from an about 0.02 μSv dose pulse. At these dose values per X-ray flash pulse, the amplitude of the detector amplifier varies with the number of photons that interacted in the active detector volume and with the total charge deposited during the duration of the pulse. Each X-ray flash produces different amplifier output signals and may be registered or not depending on the analog pulse exceeding the threshold.

Figure 5B:
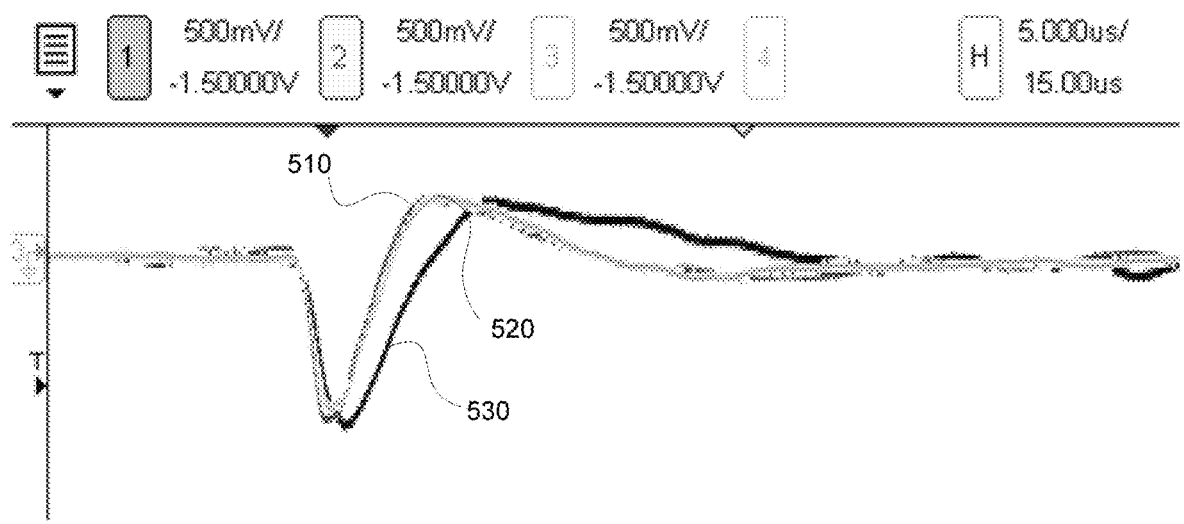
Figure 5C:
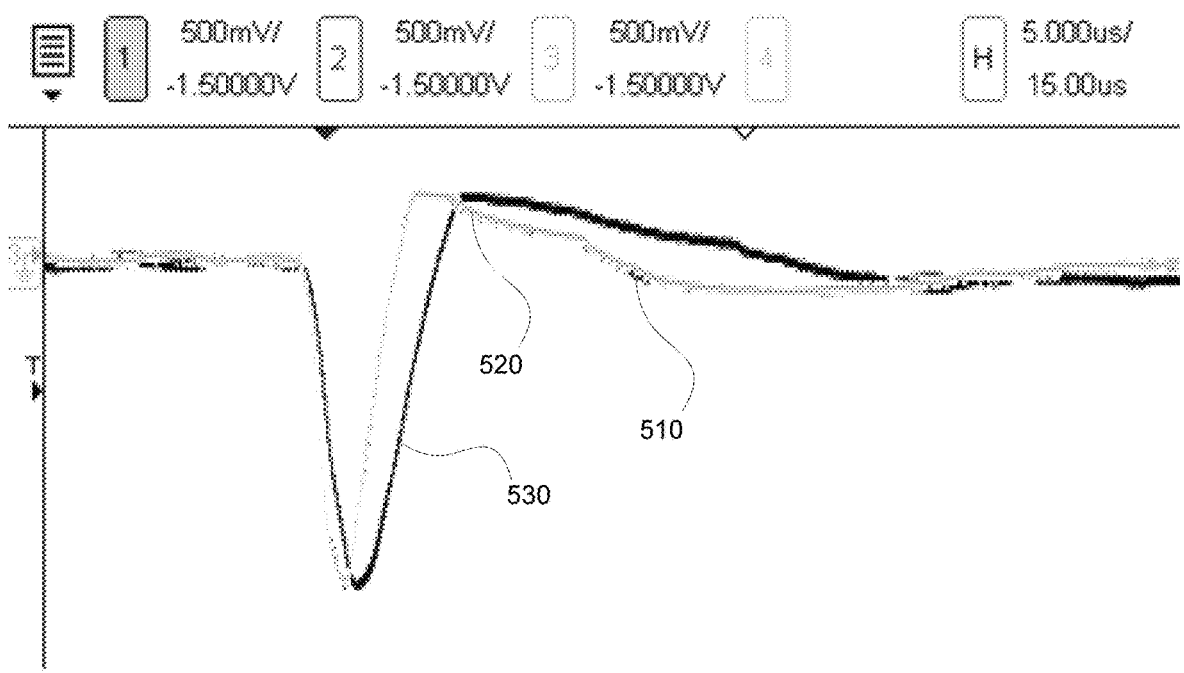
Figure 5D:
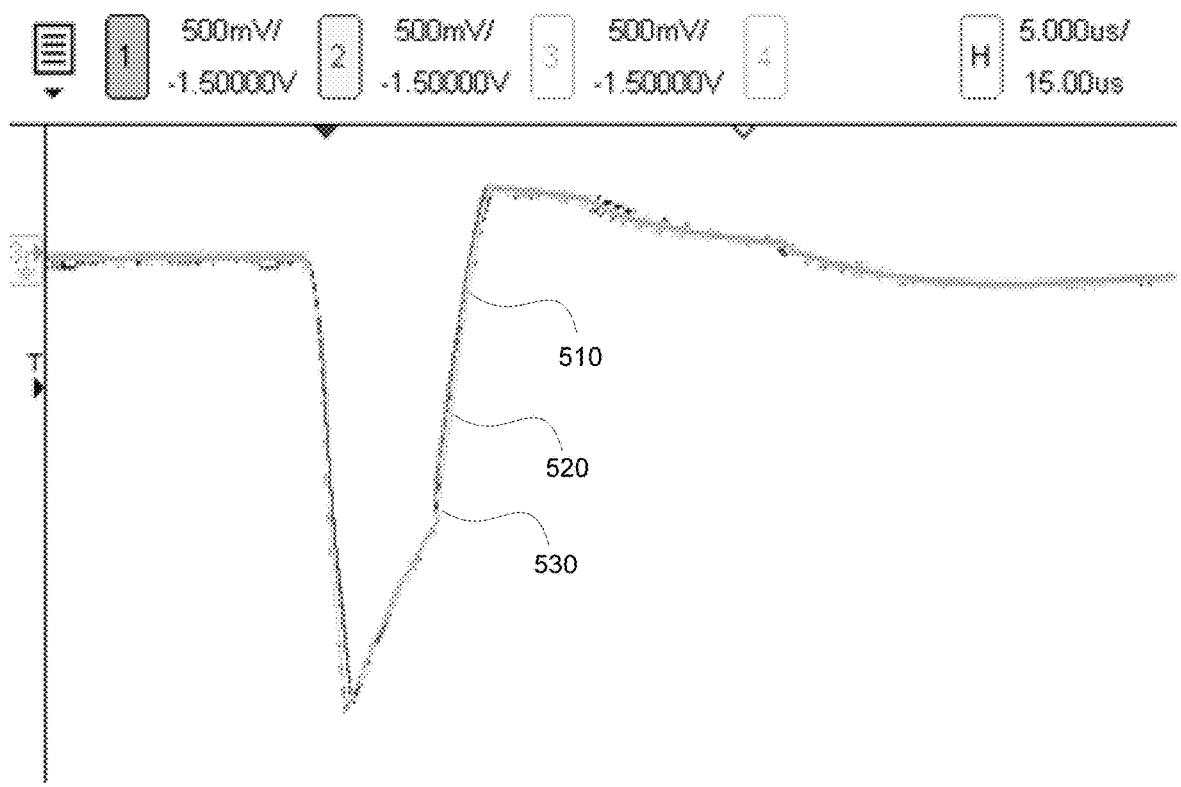

With increasing dose per X-ray flash, the amplitudes of the amplifier output pulse increase and become equal for all detectors regardless of the photon energy because a large number of photons ionized the active detector volume within the integration time and the resulting pulse amplitude becomes independent of the energy of individual photons because it is averaged over a large number of photons. FIGS. 5B, 5C, and 5D illustrate the progressive convergence of signal 510, 520, and 530 as the pulse dose increases. In the present example, the FIG. 5B illustrates a response to a dose of about 0.02 μSv, and FIG. 5C illustrates a response to a dose of about 0.06 μSv. FIG. 5D shows amplifier output signals 510, 520, and 530 resulting from large dose pulses of equal to or greater than about 0.1 μSv within the charge collecting time. Importantly, the shape of signals 510, 520, and 530 are identical even though generated from different PIN diodes with different filtering and different size.

In the presently described invention the occurrence of a synchronous signal response (e.g. coincidence) as illustrated in FIG. 5D indicates that each of the amplifier outputs are saturated due to multiple photons ionizing the detector which determines that the X-ray flash dose is larger than could be accumulated accurately. Therefore, when a synchronous signal occurs in all discriminator channels dosimeter 100 generates an over-range warning for user 110 indicating a dangerous condition caused by the X-ray flash source.

FIG. 6 provides an example of a method for providing an over-range alarm. For example, in step 610 processor 340 reads the counters from each detection channel and determines whether there is signal coincidence (e.g. synchronous signals) in step 620. If processor 340 determines that there is signal coincidence then as illustrated in step 630 processor 340 initiates an over-range alarm to user 110 that may include one or more audible alarms, visual alarms, tactile alarms, or some combination thereof. Processor 340 determines dose and dose rate values to user 110 as part of normal operation of dosimeter 100.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments.

What is claimed is:

1. A portable electronic dosimeter comprising:
a plurality of detectors each configured to detect a type of ionizing radiation, wherein each detector is associated with an amplifier configured to produce an output in response to a plurality of detected photons of the ionizing radiation and an event counter configured to produce one or more counts in response to the detected photons of the ionizing radiation over an integration time in a range 0.1 ms to 1 s; and
a processor configured to receive the one or more counts from each of the counters and determine if there is coincidence of the one or more counts of all the detectors, wherein if there is coincidence the processor is configured to provide an over range alarm signal.

2. The dosimeter of claim 1, wherein:
each detector is operated in a counting mode.

3. The dosimeter of claim 1, wherein:
the plurality of detectors comprise 2 detectors.

4. The dosimeter of claim 1, wherein:
the plurality of detectors comprise 3 detectors.

5. The dosimeter of claim 1, wherein:
the over range alarm signal indicates detection of a pulsed radiation field.

6. The dosimeter of claim 1, wherein:
the coincidence is determined by equality of at least 2 counter values.

7. The dosimeter of claim 1, wherein:
the coincidence of detector signals is detected by analogue coincidence circuitry in the time range 0.1 to 10 µs.

8. The dosimeter of claim 1, wherein:
the type of ionizing radiation comprises gamma radiation, beta radiation, neutron radiation, and x-ray-radiation.

9. The dosimeter of claim 1, wherein:
at least 1 detector comprises more than 1 threshold value.

10. The dosimeter of claim 9, wherein:
at least one of the threshold values is only exceeded by high energy photons.

11. A method comprising:
detecting a plurality of photons of ionizing radiation using a plurality of detectors each enabled for a type of ionizing radiation;
producing an output from each of the detectors in response to the plurality of detected photons;
producing one or more counts in response to the detected photons of the ionizing radiation over an integration time in a range 0.1 ms to 1 s; and
determining if there is coincidence of the one or more counts of all the detectors.

12. The method of claim 11, wherein:
providing an over range alarm signal if there is coincidence.

13. The method of claim 11, wherein:
each detector is operated in a counting mode.

14. The method of claim 11, wherein:
the plurality of detectors comprise 2 detectors.

15. The method of claim 11, wherein:
the plurality of detectors comprise 3 detectors.

16. The method of claim 11, wherein:
the over range alarm signal indicates detection of a pulsed radiation field.

17. The method of claim 11, wherein:
the coincidence is determined by equality of at least 2 counter values.

18. The method of claim 11, wherein:
the coincidence of detector signals is detected by analogue coincidence circuitry in the time range 0.1 to 10 µs.

19. The method of claim 11, wherein:
the type of ionizing radiation comprises gamma radiation, beta radiation, neutron radiation, and x-ray-radiation.

20. The method of claim 11, wherein:
at least 1 detector comprises more than 1 threshold value.

21. The method of claim 20, wherein:
at least one of the threshold values is only exceeded by high energy photons.

22. A portable electronic dosimeter comprising:
a plurality of detectors each configured to detect a type of ionizing radiation, wherein each detector is associated with an amplifier configured to produce an output in response to a plurality of detected photons of the ionizing radiation and an event counter configured to produce one or more counts in response to the detected photons of the ionizing radiation over an integration time; and
a processor configured to receive the one or more counts from each of the counters and determine if there is coincidence of the one or more counts of all the detectors in a time range of 0.1 to 10 µs, wherein if there is coincidence the processor is configured to provide an over range alarm signal.

* * * * *

UNITED STATES PATENT AND TRADEMARK OFFICE
CERTIFICATE OF CORRECTION

PATENT NO. : 11,131,778 B2  
APPLICATION NO. : 16/545217  
DATED : September 28, 2021  
INVENTOR(S) : Norbert Trost and Michael Iwatschenko-Borho Page 1 of 1

It is certified that error appears in the above-identified patent and that said Letters Patent is hereby corrected as shown below:

On the Title Page

Column 1, item (60), under "Related U.S. Application Data", Line 1, delete "62/420,277," and insert -- 62/720,277, --, therefor.

In the Claims

Column 11, Claim 8, Line 60, delete "and x-ray-radiation." and insert -- and x-ray radiation. --, therefor.

Column 12, Claim 19, Line 39, delete "and x-ray-radiation." and insert -- and x-ray radiation. --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*